United States Patent
Mann et al.

(10) Patent No.: US 6,493,448 B1
(45) Date of Patent: *Dec. 10, 2002

(54) PROCESS FOR ECHO SUPPRESSION WITH ADAPTIVE FIR FILTERS

(75) Inventors: Armin Mann, Stuttgart (DE); Hans Jürgen Matt, Remseck (DE); Michael Walker, Baltmannsweiler (DE)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/231,794

(22) Filed: Jan. 15, 1999

(51) Int. Cl.⁷ .............................................. H04M 9/08
(52) U.S. Cl. ..................... 379/406.01; 379/406.02; 379/406.03; 379/406.04; 379/406.05; 379/406.06; 379/406.7; 379/406.08; 379/406.9; 379/406.11; 379/406.12; 379/406.13; 379/406.14
(58) Field of Search ................... 379/406–412, 379/406.01–406.16

(56) References Cited

U.S. PATENT DOCUMENTS

| | | | | |
|---|---|---|---|---|
| 5,305,307 A | * | 4/1994 | Chu | |
| 5,428,605 A | * | 6/1995 | Andre | 379/410 |
| 5,513,265 A | * | 4/1996 | Hirano | 379/406 |
| 5,553,137 A | * | 9/1996 | Nyhart et al. | 379/410 |
| 5,570,423 A |   | 10/1996 | Walker et al. | |
| 5,790,632 A | * | 8/1998 | Antonio et al. | 379/406 |
| 5,828,756 A | * | 10/1998 | Benesty et al. | 379/410 |
| 5,856,970 A | * | 1/1999 | Gee et al. | 379/406 |
| 6,134,322 A | * | 10/2000 | Hoege et al. | 379/406 |
| 6,185,300 B1 | * | 2/2001 | Romesburg | 379/406 |

FOREIGN PATENT DOCUMENTS

| | | |
|---|---|---|
| DE | 3431 141 A1 | 3/1986 |
| DE | 197 14 322 A1 | 11/1997 |
| EP | 0 627 825 A2 | 12/1994 |
| EP | 0 742 664 A2 | 11/1996 |
| EP | 0 746 134 A2 | 12/1996 |
| EP | 0 758 830 A2 | 2/1997 |
| EP | 0 792 029 A2 | 8/1997 |
| WO | WO 95/34983 | 12/1995 |

* cited by examiner

*Primary Examiner*—Forester W. Isen
*Assistant Examiner*—Ramnandan Singh
(74) *Attorney, Agent, or Firm*—Sughrue Mion, PLLC

(57) ABSTRACT

A process for suppressing total echoes comprising a plurality of partial echoes in telecommunications (TK) equipment such as terminals, transmission systems, or switching equipment by means of adaptive FIR (=Finite Impulse Response) filters that simulate the total echo and subtract it from the echo-affected useful signal transmitted to the respective TK equipment, whereby n partial FIR filters are provided, which respectively simulate a partial echo, is characterized in that m parallel, mutually independent TK channels are provided with an echo suppression function and that for this purpose a variable sub-quantity of the partial FIR filters is assigned to a TK channel to be operated, respectively, as required depending on the number of partial echoes and the size of the occurring delay times between signal and echo. This permits effective echo suppression without significant memory space and computational effort even for a large number of m parallel, mutually independent TK channels, such as must be processed in switching equipment or gateways.

15 Claims, 5 Drawing Sheets

PROCESS FOR ECHO SUPPRESSION WITH ADAPTIVE FIR FILTERS

BACKGROUND OF THE INVENTION

The invention relates to a process for suppressing total echoes comprised of a plurality of partial echoes in telecommunications (TK) equipment such as terminals, transmission systems, or switching equipment by means of adaptive FIR (=Finite Impulse Response) filters that simulate the total echo and subtract it from the echo-affected useful signal transmitted to the respective TK equipment, whereby n partial FIR filters are provided, which respectively simulate a partial echo.

When voice signals are transmitted on telecommunication lines, acoustic echoes can form, on the one hand, at the "near end" of the sending user due to the direct sound transmission from the loudspeaker to the microphone of the terminal. Particularly if several terminals are arranged in close spatial proximity to each other, for example, in an office or conference room with many telephone connections, the near echo problem is significantly increased since there is a coupling from each loudspeaker signal to each microphone. A multi-channel echo suppression process proposed in EP 0 627 825 A2 and the associated electronic circuitry is intended to provide a remedy. However, in addition to the near acoustic echo, an electric line echo, possibly composed of a variable number of partial echoes, also forms due to the reflections of the sent voice signals at variably remote points in the transmission channel, e.g. with 2–4 wire hybrids (terminating sets) in the terminal or in the witching equipment and gateways. A distinction is typically drawn between so-called "near echoes" that are reflected back to the speaker within a time interval of up to 128 ms and far echoes, which return to the speaker within a time frame of 640 ms, the large skew of which is particularly disturbing since the speaker has already made noticeable progress in his speech by the time his own reflected voice signal comes back to him. Such delayed far echoes occur, for example, in intercontinental calls transmitted via deep-sea cables or satellites. The network operators maintaining the corresponding long-distance networks therefore aim to suppress, as effectively as possible, particularly the far echoes with a large skew as well as the near echoes, which may be reflected back with greater intensity.

EP 0 792 029 A2, for example, proposes an echo suppression device with an adaptive filter comprised of a coarse and fine detector for near-end voice signals arranged on both sides of the echo suppression device to permit monitoring of the incoming signal before and after echo suppression. During speech pauses from the near end, this is to permit an adaptation to the reflected echo value.

The initially cited DE 44 30 189 A1 proposes a cost-effective process which can be used under different acoustic conditions and which uses a FIR filter whose filter coefficients are determined based on the NMLS algorithm. For echo suppression in a TK network with many parallel channels, this method uses such an echo suppressor with an adaptive FIR filter implemented in software in a digital signal processor for each channel. For this purpose, the adaptive FIR filter is to simulate the total echo to be expected, possibly comprising several individual echoes, and to subtract the echo-affected useful signal transmitted to the TK terminal.

SUMMARY OF THE INVENTION

In contrast, the object of the present invention is to further develop a process of the initially described type, which permits effective echo suppression without requiring excessive memory space and computation effort, even if there is a very large number of m parallel, mutually independent TK channels, such as must be processed, for example, in switching equipment or network hybrids.

This object is attained by the invention in that m parallel, mutually independent TK channels are provided with an echo suppression function and that a variable sub-quantity of the partial FIR filters is assigned, respectively, to a TK channel to be operated as required, depending on the number of partial echoes and the size of the occurring delay times between signal and echo.

This flexible assignment of the partial FIR filters per processed TK channel as a function of the number of individual echoes and the size of the occurring delay times between signal and echo makes it possible, despite the very high number of m channels, to design the system for implementing the process in a compact manner and to utilize it to a high degree.

Particularly preferred is an embodiment of the process according to the invention, wherein the m independent TK channels are operated in time division multiplexing with echo suppression functions. This permits an even-compacter hardware or software design to implement the process, since many functional elements, e.g. partial FIR filters, can be used simultaneously for several TK channels. In a further advantageous embodiment, the adaptive FIR filters are implemented by a computer program that calculates the partial echoes to be simulated in real time. On the one hand, this minimizes the hardware for the system for implementing the process according to the invention and, on the other hand, permits system changes in a simple manner through modification or replacement of the computer program. In a further development of this embodiment, the computer program comprises same-type subroutines that run independently and synchronously to each other, whereby each of these subroutines acts as a partial FIR filter and can simulate a partial echo. Such a modular program is particularly simple to create and, in practice, can be expanded to any number of parallel running subroutines of the same type and thus to a corresponding number of partial FIR filters.

An alternative embodiment to the above described software solution provides that n same-type partial FIR filters capable of simulating partial echoes, respectively, are implemented in a single ASIC (=Application Specific Integrated Circuit); that the partial echoes to be simulated are calculated in real time in the ASIC; and that a digital signal processor is provided to control the ASIC and adjust the filter settings, particularly after calculation of the coefficients required for echo simulation and time delays in the ASIC.

The high integration density of an ASIC keeps a device for implementing the process according to the invention particularly compact. Since the digital signal processor is significantly relieved by integrating the FIR filters into the ASIC, many more parallel TK channels can be operated with effective echo suppression at a processor effort that remains constant. This permits processing of even larger echo delay times (e.g. up to 640 ms), many individual echoes per total echo, and many parallel channels (>2000) at minimum cost. Advantageously, a number of partial FIR filters are operated in cascaded manner to simulate a total echo. Currently, TK network operators require three to five partial echoes to be suppressed per channel. This number may further increase in the future.

An advantageous further development is distinguished by the fact that, for each partial FIR filter, a macrocell is provided in the ASIC comprising a shift register of suitable length for intermediate storage of the sampled voice signals, a demultiplexer unit for adjusting the effective shift register length, and a summing unit for adding the sampling values weighted with the corresponding coefficients. The macrocells can be identically configured to simplify production and thus reduce the cost of an ASIC with many same-type partial FIR filters.

In particular, cascading of a plurality of macrocells is easily possible, which permits any desired, flexible interconnection, e.g. for simulating a total echo, and thus a particularly high utilization of the macrocells.

A further variant of the process for echo suppression according to the invention is distinguished in that a Dirac impulse is sent to the corresponding TK channel, the echo answer thereto is detected, and suitable coefficients for simulating the total echo are calculated and stored for the corresponding FIR filter.

Instead of the Dirac impulse, other process variants send a defined analog noise signal sequence to the corresponding TK channel, detect the echo answer thereto, and calculate and store suitable coefficients for simulating the total echo. The send duration of the noise signal sequence is typically less than one second.

Particularly preferred is a further development of this process variant, in which the analog noise signal sequence comprises a Gaussian noise signal that is preferably limited to the bandwidth of the TK channel to be operated.

A further alternative process variant is distinguished in that a synthetic, preferably ternary pseudo noise sequence is sent to the corresponding TK channel, the echo answer thereto is detected, and suitable coefficients for simulating the total echo are calculated and stored. As a rule, the pseudo noise sequence is selected such that only the main value of the sequence has a correlation value q, while the subvalues have the correlation value 0.

It is particularly preferred to obtain the coefficients for echo simulation by correlating the sent signals with the received echo signals.

Also preferred is a further development of the process according to the invention, in which a NLMS (=Normalized Least Mean Square) algorithm is used for calculating the coefficients from the received echo signals acknowledging the sent signals. This minimizes the required computing time and computing capacity to achieve a satisfactory result. In this case, the length of the noise sequence is advantageously matched to the length of the FIR filter.

In a further preferred process variant, the transmission of non-voice signals on a TK channel is additionally detected and, particularly if modem or fax signals are identified, the echo suppression function on the corresponding TK channel is automatically switched off. This increases connection reliability for fax or modem connections.

In a further development of this process variant, a discrete Fourier transformation (=DFT), particularly a Goertzel algorithm, is used for detecting non-voice signals. As a result, this additional function requires very little memory space and computing capacity and detection is very fast and reliable.

In addition, in a further advantageous process variant, a compander function may also be provided for combined suppression and masking of line echoes by sending the receive level on the corresponding TK channel during speech pauses. This further enhances echo suppression and thus increases the comfort for the end subscriber.

The compander function can also be implemented as a computer program or in the form of hardware in an ASIC, preferably the same ASIC as the partial FIR filters. In this case, the hardware units are particularly compact and inexpensive to manufacture.

BRIEF DESCRIPTION OF THE DRAWINGS

Additional advantages of the invention will become apparent from the description and the drawing. Furthermore, the aforementioned features, as well as those described below, can be used either alone or in any combination. The embodiments shown and described are not to be understood as a complete enumeration but instead have an exemplary character to describe the invention.

The invention is depicted in the drawing and will be explained in further detail by means of exemplary embodiments.

DETAILED DESCRIPTION OF THE INVENTION

Figure 1:
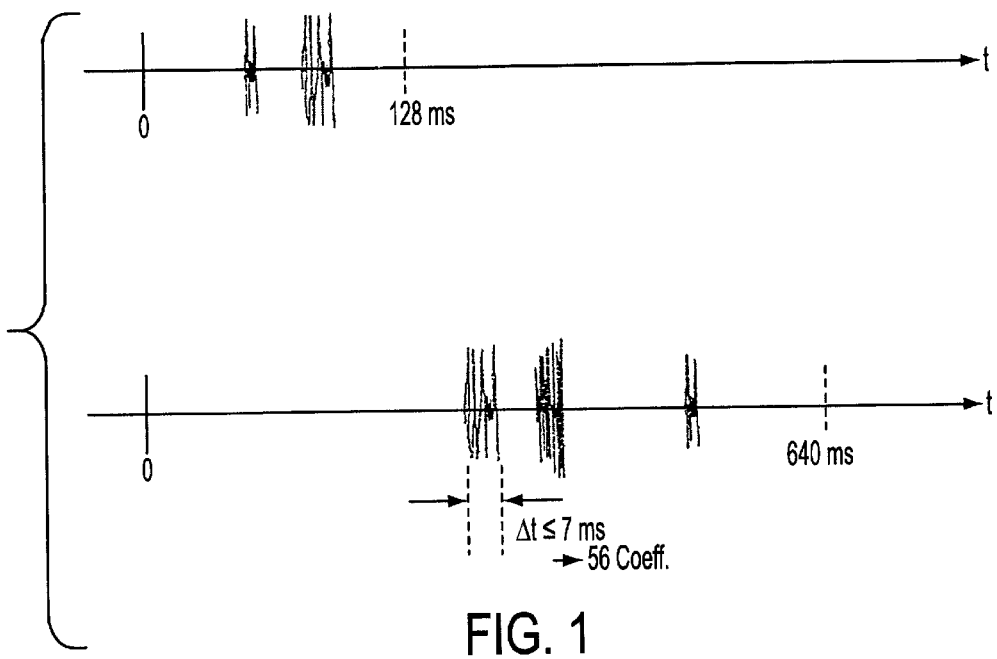
FIG. 1 shows the temporal course of a typical near-echo sequence with two partial echoes in the upper half and a far-echo sequence with three partial echoes in the lower half.

The upper part of FIG. 1 shows the temporal course of a sequence of partial near echoes, which by definition have a delay time of up to 128 ms compared to the instant when the signal is sent from the corresponding TK subscriber. Such line echoes are created by reflection, for example, in switching equipment, network hybrids, and other types of nodes in the network, but they do not interfere if the time elapsed after the sending of the original signal is not perceptible (on the order of 10 ms) because a speaker on a TK terminal also receives a certain echo effect in his head from acoustic echoes in the space around him and from the sound of his own body, which he "compensates" for almost automatically because he is used to it. Line echoes become very problematic, however, whenever delay times exceed 50 ms, which is shown, among other things, in the lower part of FIG. 1. Far echoes with time delays on the order of 640 ms, for example, can occur on continental long-distance calls or in intercontinental connections. Satellite transmission of a signal from one continent to another in itself typically takes about 250 ms. At the instant when such a far echo is received by the original sender, the sender has already noticeably advanced in his speech such that the echo effect is particularly disturbing. Similarly strong time delays can occur if a voice signal goes through significant compression and decompression or if it must be delayed parallel to a compressed picture transmission to maintain lip synchronization.

Figure 2:
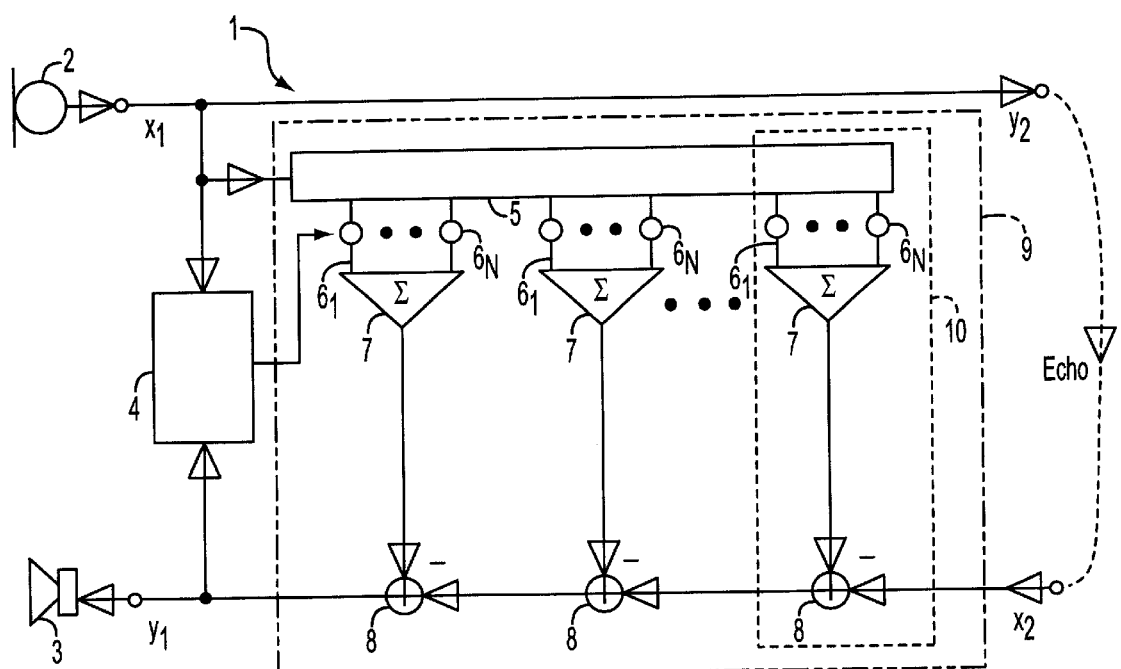
FIG. 2 is a schematic representation of a simple embodiment of an echo suppression device with only one TK channel to be operated.

To suppress this type of echoes, devices with adaptive FIR (=Finite Impulse Response) filters are used to simulate the echoes and subsequently subtract the echo-affected useful signal. FIG. 2 schematically shows such a device 1 for operating only one TK channel. From microphone 2 of a TK terminal, a near-end send signal $x_1$ is transmitted and arrives at the remote subscriber as send signal $Y_2$. On the reverse channel to loudspeaker 3 of the TK terminal, in addition to the signal transmitted by the remote subscriber, an echo signal comprising several partial echoes is injected into the received signal $x_2$, which is post-processed by the echo suppression unit and enters loudspeaker 3 as incoming useful signal $y_1$.

To permit simulation of a realistic echo signal, a test signal can be sent to the line at point $Y_2$, the effect of which accelerates the convergence of an NLMS algorithm. On a computer, particularly a digital signal processor (=DSP) 4, coefficients suitable for simulating the echo are calculated from the echo answer by means of the NLMS algorithm N. These coefficients are supplied to the actual echo subtraction device, which is implemented on an ASIC (=Application Specific Integrated Circuit) 9. In time division multiplex, the sampling values of the actual voice signal coming from the TK channel are entered into a delay line 5, which typically takes the form of a shift register. Furthermore, selected sampling values from the shift register are supplied to the ASIC 9. In N multiplier elements $6_1$ to $6_N$, the product of the corresponding sampling values from the delay line 5 is formed with the coefficients supplied from the DSP 4. For each partial echo, the corresponding sum is calculated from these products in the summing elements 7, and subtracted by means of negative adders 8 from the useful signal coming in at point $x_2$ and initially affected by the entire line echo, such that at point y, a substantially echo-free signal is supplied to the TK channel.

Depending on the quality required of the echo suppression, a greater or lesser number n of partial FIR filters 10 must be provided within ASIC 9, which respectively simulate a partial echo by means of a corresponding number of coefficients and subtract it from the useful signal. If the temporal width of a partial echo, as shown in the lower part of FIG. 1, is assumed as $\Delta t \leq 7$ ms, a number N=56 coefficients per partial echo, respectively, is required for exact simulation of the partial echo at a processing speed of 125 ms (corresponding to 8 kHz). Cascading a corresponding number of same-type partial FIR filters 10 on the ASIC 9 then makes it possible to take into account a corresponding number of partial echoes. Network operators currently require a suppression capacity of three to five partial echoes per total echo.

Figure 3A:
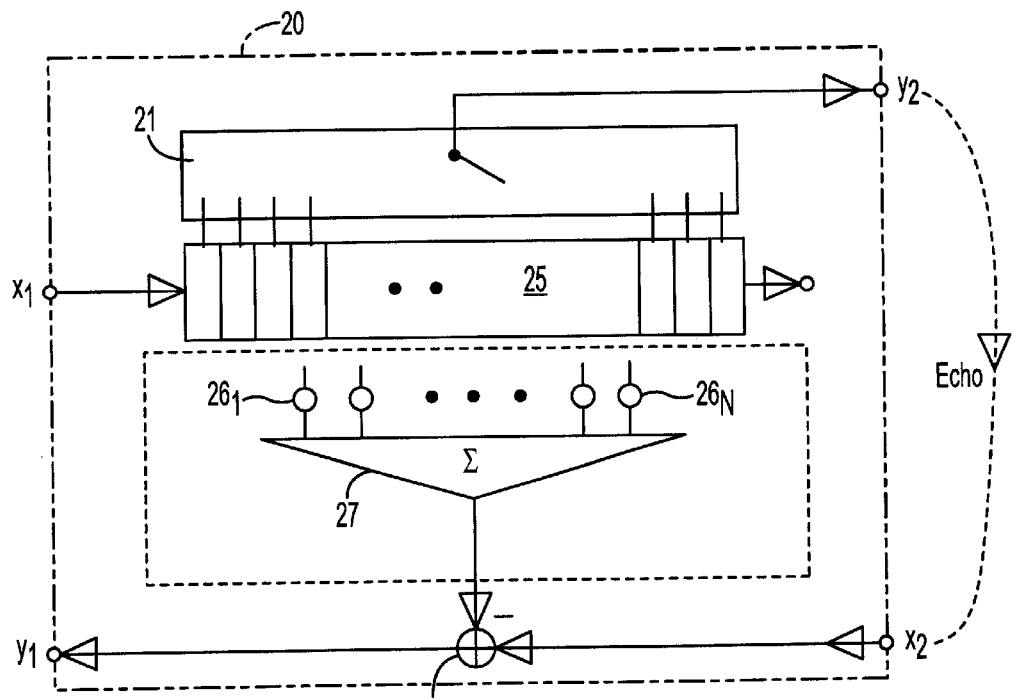
FIG. 3a is a macro cell for a partial FIR filter.

The different partial FIR filters 10 can be provided, respectively, as a macro cell on the ASIC. Such a macro cell 20 is schematically depicted in FIG. 3a. Macro cell 20 comprises a shift register 25, the effective length of which is adjustable by a demultiplexer unit 21 and into which the sampling values of the current voice signals are input via $x_1$. A summing element 27 sums the sampling values from the N multiplier elements $26_1$ to $26_N$ weighted by the corresponding coefficients and a negative adder 28 subtracts the simulated partial echoes thus obtained from the echo-affected useful signal on line $x_2-y_1$.

Figure 3B:
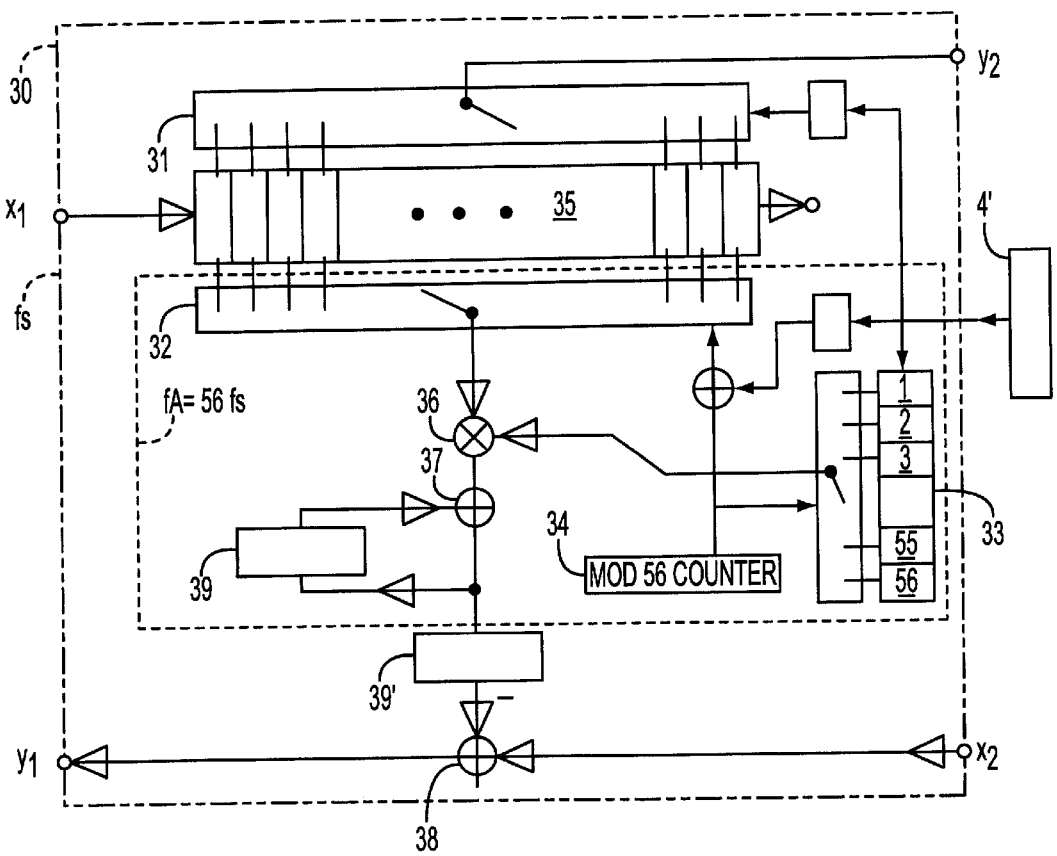
FIG. 3b is a concrete further development of the macro cell according to FIG. 3a with coefficient memory for one TK channel that can be read out in multiplex mode.

FIG. 3b shows an ingenious further development of macro cell 20 according to FIG. 3a: macro cell 30 comprises a coefficient memory 33 for N coefficients addressable by the digital signal processor 4', which can be read out addressed by a modulo-N counter (the example shows a module-56 counter) 34. Consequently, only a single multiplier element 36 is required, to which the corresponding coefficients from the coefficient memory 33 and the corresponding sampling values from the shift register 35 are supplied for multiplication at a working frequency $f_A = N \cdot f_s$, whereby the sampling values are stored in the shift register 35 via a sampling frequency $f_s$. The effective length of shift register 35 is again adjusted with a first demultiplexer unit 31 and read out by a second demultiplexer unit 32 in time with the modulo-N counter 34.

The product values from sampling values and corresponding coefficients output by the multiplier element 36 are supplied to an adder 37 that adds them, respectively, to the sum of the preceding product values stored via a feedback loop in a first intermediate memory 39 and that finally stores the partial echo signal thus simulated in a second intermediate memory 39'. This partial echo signal is then subtracted on line $X_2-y_1$ by means of a subtracting element (or a negative adder) 38 from the echo-affected useful signal transmitted to the TK unit.

Figure 4:
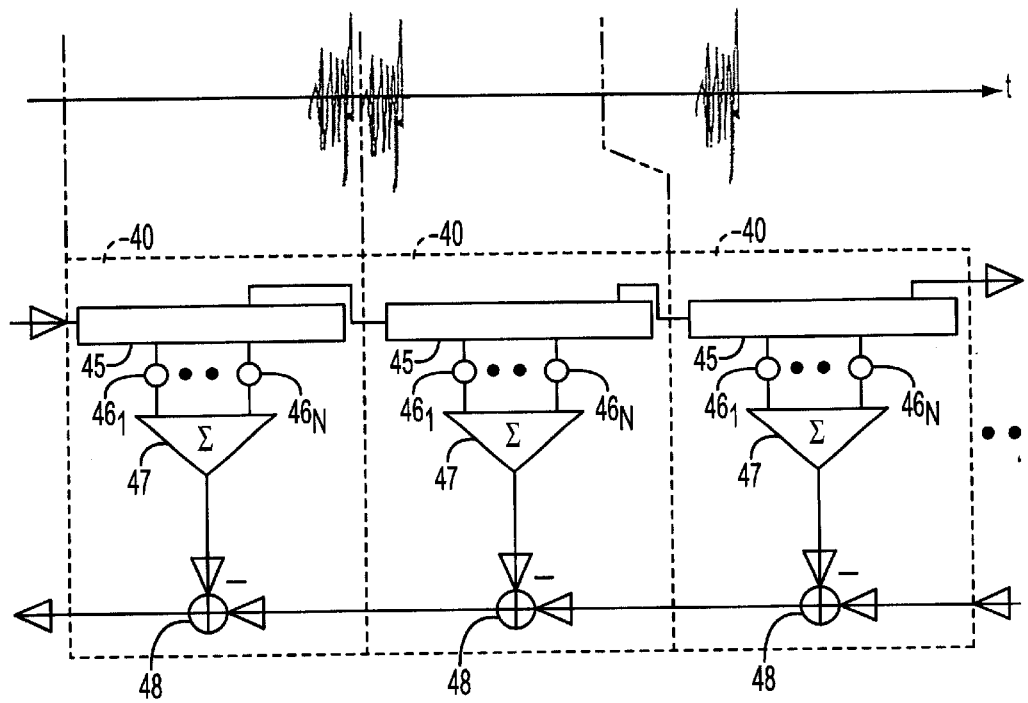
FIG. 4 is a schematic representation of cascaded macro cells according to FIG. 3a or 3b, whereby the upper part of the figure shows the temporal course of partial echoes that are, at times, quite closely spaced.

As shown schematically in FIG. 4, a plurality of substantially identically configured macrocells 40 with shift registers 45, multiplier elements $46_1$ to $46_N$, summing elements 47, and subtracting elements 48 can be arranged in cascaded manner in the ASIC. This identical configuration of macrocells 40 can significantly decrease the production costs of the ASIC. Furthermore, flexible interconnection of the macrocells permits better utilization of the processing capacity of the ASIC. According to the invention, this permits the assignment to a TK channel to be operated of a variable sub-quantity of the partial FIR filters formed by macrocells 40 as required depending on the number of partial echoes and the size of the occurring delay times. Thus, a channel with few partial echoes and/or short delay times "consumes" fewer partial FIR filters than a channel with many partial echoes.

Figure 5A:
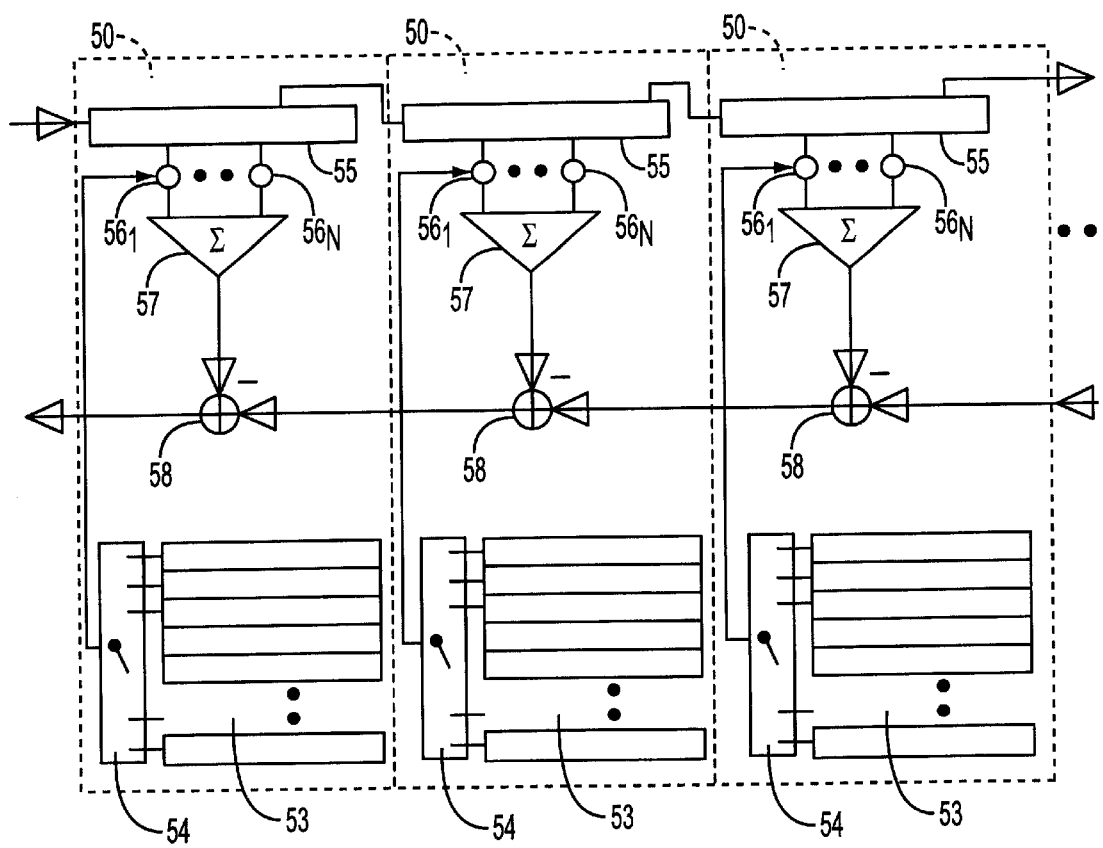
FIG. 5a is a further embodiment with cascaded macro cells with coefficient memories that can be read out in multiplex mode for time division multiplexing of m TK channels.

FIG. 5a shows a further embodiment of the echo suppression device with cascading, substantially identically configured macrocells 50, again comprising, respectively, a shift register 55, N multiplier elements $56_1$ to $56_N$, a summing element 57, and a subtracting element 58. This arrangement is provided for time division multiplexing of m TK channels. For this purpose, the length of shift register 55 is greater by a factor m, for example. The selection of the appropriate sampling values must now take into account the nesting of the sampling values of the m TK channels in shift register 55. In addition, however, the macrocells 50 also comprise, respectively, a coefficient memory 53 comprising N coefficients, which can be read out by a demultiplexer 54. The coefficient values are supplied to the corresponding multiplier elements $56_1$ to $56_N$, are multiplied by the respective sampling values from shift register 55, and are combined in adder 57 to a corresponding simulated echo signal, which is to be subtracted from the useful signal in the subtracting element 58.

Figure 5B:
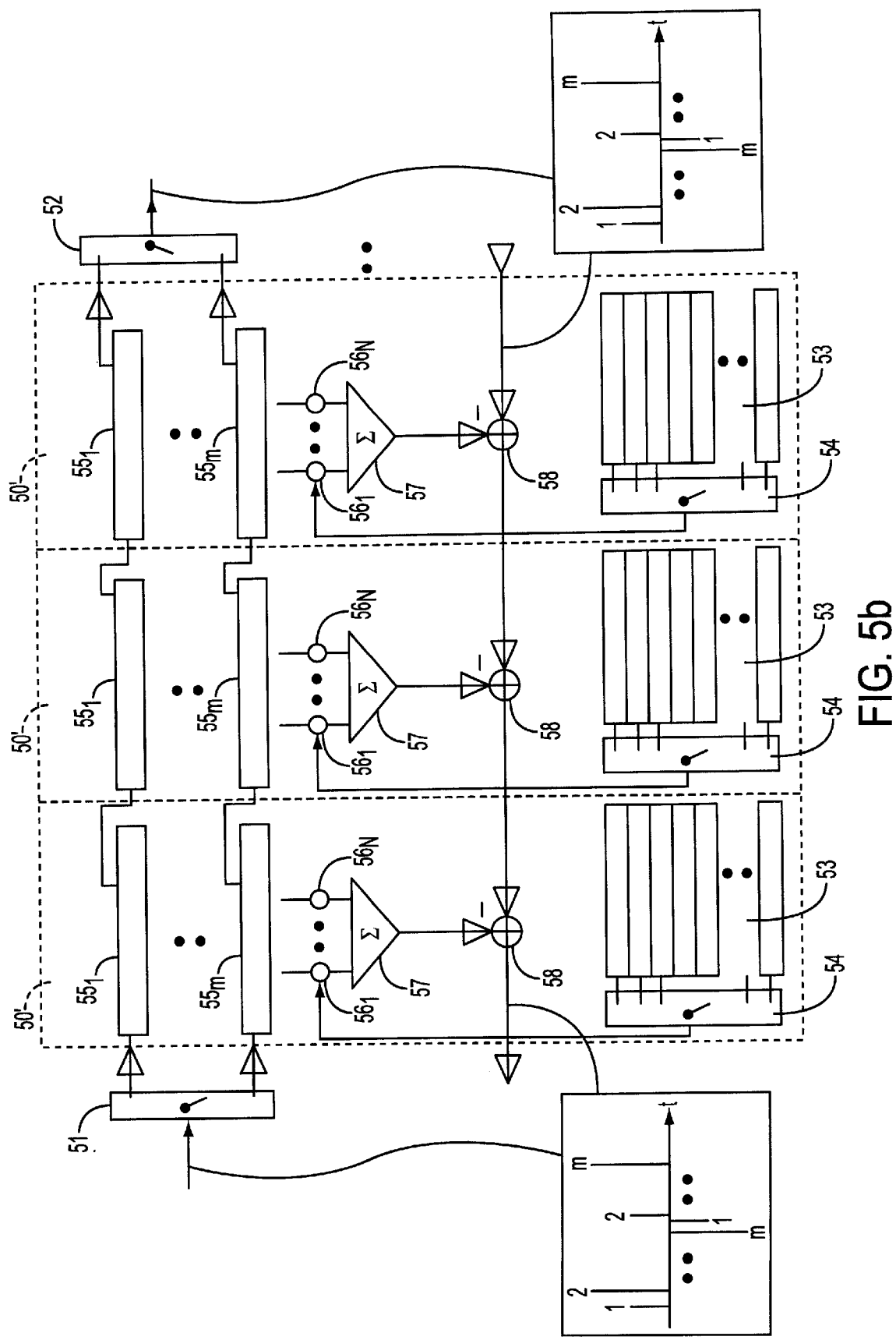
FIG. 5b is an embodiment with cascaded macro cells and a multiplexed shift register arrangement for the incoming sampling values of different, mutually independent TK channels.

FIG. 5b shows a variant of the device with cascaded macro cells 50'. These are distinguished from the macrocells 50 in FIG. 5a in that, instead of a single shift register 55, they have a number of shift registers $55_1$ to $55_m$ corresponding to a number m of parallel, mutually independent TK channels to be operated. These are supplied via an input multiplexing unit 51 with corresponding sampling values from the outgoing near-end signal, which can be recombined by means of an output demultiplexer unit 52. The temporal course of the m sampling values corresponding to the m TK channels is shown schematically in the two boxes at the lower left and right corners of FIG. 5*b*. Thus, a corresponding coefficient memory 53 can be assigned to each of the m TK channels to be operated and echo suppression can be performed on all m TK channels via a single total filter comprising a plurality of partial FIR filters, which is switch-selectable in multiplex operation.

Figure 6:
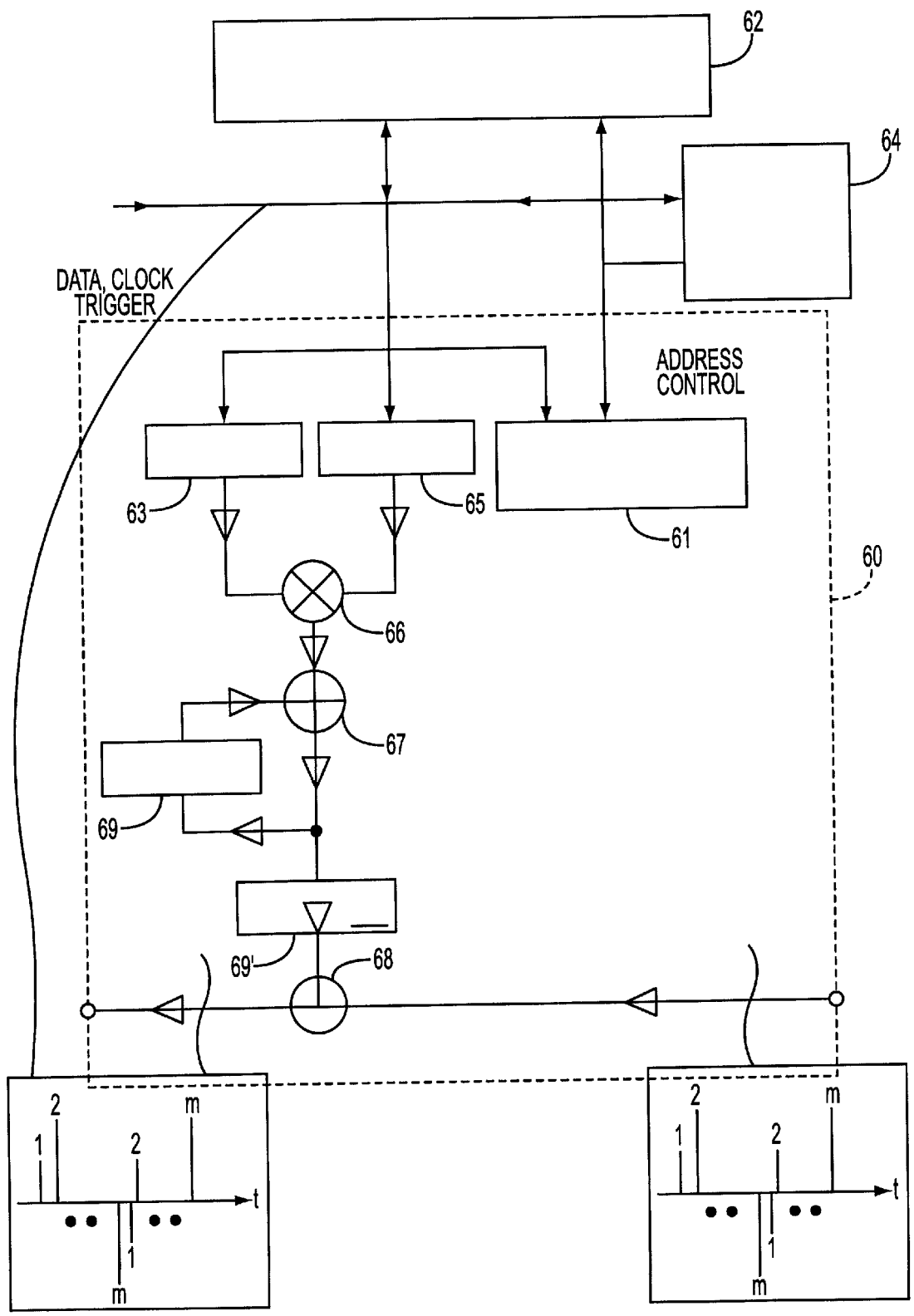
FIG. 6 is an embodiment in which the coefficient memory and the sampling value memory are swapped out to a RAM unit and the sequence of the partial echo simulations for the different TK channels is substantially controlled by a control unit in the ASIC.

FIG. 6 finally shows a further particularly compact embodiment integrating a control unit 61 on the ASIC 60, which controls the sequence of the echo suppression process through address calculation of memory data in a memory unit 62 swapped out to a RAM and through control of read-in and read-out processes between the memory unit 62, the digital signal processor 64, and the filter elements integrated on the ASIC 60. In this embodiment, the partial FIR filters comprise a single multiplier element 66 to which are supplied in time division multiplexing, controlled by control unit 61, the coefficients via a first buffer memory 63 and the corresponding sampling values from the memory unit via an additional buffer memory 65 to form the product. The sampling values weighted by the coefficient are subsequently added in an adder 67 via a feedback loop to the sum of the preceding product values stored in a first intermediate memory 69. The partial echo thus simulated is finally stored in a second intermediate memory 69' and then subtracted by means of a subtracting element 68 from the respectively received echo-affected useful signal. The temporal course of the signal sampling values from the m independent TK channels is shown again schematically in two boxes at the lower left and right corners of the figure.

The embodiment shown in FIG. 6 requires particularly little hardware. The digital signal processor 64 is relieved to the greatest possible extent and used essentially only for calculating the coefficients, while control unit 61 on the ASIC 60 executes all control processes. ASIC 60, in turn, is relieved from costly memory functions in that the storage of coefficients and sampling values is shifted to an external RAM 62. RAM 62, a standard electronic component is particularly economical and available with a high storage capacity and furthermore replaces the function of the shift register in the above-described embodiments. The coefficient memory read-out functions of the multiplexers, as provided in the embodiments of FIGS. 3*b*, 5*a*, and 5*b*, are replaced by a simple address calculation and by corresponding control of read-in and read-out processes by control unit 61.

Furthermore, in embodiments of the echo suppression device that are not shown in the drawing, a device may be provided for detecting non-voice signals on one of the TK channels to be operated, particularly for detecting modem or fax signals. This permits an automatic switch-off of the echo suppression function and thus enhances the stability of the corresponding modem connection.

Furthermore, a compander circuit for the combined suppression and masking of line echoes may be provided additionally, which is preferably implemented on the same ASIC as the FIR filter. This can further enhance the echo suppression function.

The aforementioned test signals for obtaining suitable coefficients for echo simulation on the corresponding TK channel can comprise Dirac impulses, analog Gaussian noise signals, which are preferably limited to the band width of the TK channel to be operated, or synthetic, preferably ternary pseudo noise sequences. The coefficients for echo simulation are preferably obtained by correlating the previously sent signals with the received echo signals or directly by means of the NLMS (=Normalized Least Mean Square) algorithm.

In other embodiments, the above described hardware components for implementing the process according to the invention can also be entirely or partly replaced by the use of corresponding computer programs, which respectively assume the function of the hardware components.

What is claimed is:

1. A process for suppressing a total echo comprised of a plurality of partial echoes in telecommunications equipment such as terminals, transmission systems, or switching equipment by means of adaptive FIR (=Finite Impulse Response) filters that simulate the total echo and subtract it from the echo-affected useful signal transmitted to the respective telecommunications equipment, whereby n FIR filters are provided, which respectively simulate a partial echo, said method comprising the steps of:

providing m parallel, mutually independent telecommunications channels with an echo suppression function; and assigning a variable sub-quantity of the n FIR filters, respectively, to a telecommunications channel to be operated, as required depending on the number of partial echoes and the size of the occurring delay times between signal and echo.

2. A process according to claim 1 characterized in that the m independent telecommunications channels are operated in time division multiplexing with the echo suppression function.

3. A process according to claim 1 or 2 characterized in that the adaptive FIR filters are implemented by a computer program that calculates in real time the partial echoes to be simulated.

4. A process according to claim 3 characterized in that the computer program comprises same-type subroutines which, respectively, run synchronously independently of each other, and that each of these subroutines acts as one of said n FIR filters and is able to simulate a partial echo.

5. A process according to claim 1 or 2 characterized in that n equal-type FIR filters which, respectively, can simulate a partial echo, are implemented in a single Application Specific Integrated Circuit(ASIC), said process further comprising:

calculating the partial echoes to be simulated in real time in the ASIC, and providing a digital signal processor, which controls the ASIC and makes the filter adjustments in the ASIC, particularly after calculation of the coefficients and time delays required for echo simulation.

6. A process according to claim 5 further comprising:

providing a macro cell in the ASIC for each of said n FIR filters, and operating a plurality of identically configured macro cells in cascaded manner.

7. A process according to claim 1 or 2 further comprising the steps of sending a Dirac impulse to the respective telecommunications channel;

measuring the echo answer thereto and calculating and storing suitable coefficients for simulating the total echo.

8. A process according to one of claims 1 or 2 further comprising the step of sending a defined analog noise signal sequence to the corresponding telecommunications channel, measuring the echo answer thereto, and calculating and storing suitable coefficients for simulating the total echo.

9. A process according to claim 8 characterized in that the analog noise signal sequence comprises a Gaussian noise signal, which is limited substantially to the bandwidth of the telecommunications channel to be operated.

10. A process according to one of claims 1 or 2 further comprising the steps of sending a synthetic, preferably ternary pseudo noise sequence to the corresponding telecommunications channel, measuring the echo answer thereto, and calculating and storing suitable coefficients for simulating the total echo.

11. A process according to claim 10 further comprising obtaining the coefficients for echo simulation by correlating the signals sent with the echo signals received.

12. A process according to claims 1 or 2 characterized in that for coefficient calculation from the received echo signals, knowing the sent signals, a Normalized Least Mean Square algorithm is used to calculate the filter coefficients.

13. A process according to claims 1 or 2 further comprising detecting the transmission of non-voice signals on one of the telecommunications channels and, if a modem or fax connection is present, automatically switching off the echo suppression function on the respective telecommunications channel.

14. A process according to claim 13 characterized in that a discrete Fourier transformation, particularly a Goertzel algorithm, is used for detecting non-voice signals.

15. A process according to claims 1 or 2 characterized in that, additionally, a compander function is used for masking occurring line echoes by lowering the receive level on the corresponding TK channel during speech pauses.

* * * * *